(12) United States Patent
Pengg et al.

(10) Patent No.: US 8,522,846 B2
(45) Date of Patent: Sep. 3, 2013

(54) ANTISKID CHAIN WITH SIDEWALL PROTECTION COVERS

(75) Inventors: Agyd Pengg, Klagenfurt (AT); Bernhard Niess, Ottendorf (AT)

(73) Assignee: Pewag Schneeketten GmbH & Co KG, Bruckl (AU)

( * ) Notice: Subject to any disclaimer, the term of this patent is extended or adjusted under 35 U.S.C. 154(b) by 0 days.

(21) Appl. No.: 13/233,460

(22) Filed: Sep. 15, 2011

(65) Prior Publication Data

US 2012/0060986 A1 Mar. 15, 2012

(30) Foreign Application Priority Data

Sep. 15, 2010 (AT) ................. A 1534/2010

(51) Int. Cl.
*B60C 11/00* (2006.01)
(52) U.S. Cl.
USPC .................................... 152/245; 152/233
(58) Field of Classification Search
USPC ............. 152/213 R, 221, 222, 231, 239, 240, 152/241, 245
See application file for complete search history.

(56) References Cited

U.S. PATENT DOCUMENTS

| | | | | |
|---|---|---|---|---|
| 3,228,446 A | * | 1/1966 | Meys | 152/241 |
| 4,388,754 A | * | 6/1983 | Ilon | 29/446 |
| 5,082,039 A | * | 1/1992 | Franklin | 152/241 |
| 5,280,816 A | * | 1/1994 | Connelly | 152/243 |
| 8,240,348 B2 | * | 8/2012 | Pengg et al. | 152/245 |
| 2010/0060072 A1 | | 3/2010 | Rieger et al. | |

FOREIGN PATENT DOCUMENTS

| | | |
|---|---|---|
| AT | 500295 B1 | 6/2006 |
| DE | 10359155 B4 | 7/2006 |
| EP | 976588 A1 | 2/2000 |
| EP | 1520734 A2 | 4/2005 |
| EP | 2008838 B1 | 10/2009 |
| EP | 2163409 A1 | 3/2010 |
| JP | 2009006998 A | 1/2009 |

OTHER PUBLICATIONS

Translation of EP 2163409.*

* cited by examiner

*Primary Examiner* — Jason Bellinger
*Assistant Examiner* — Jean Charleston
(74) *Attorney, Agent, or Firm* — Design IP

(57) ABSTRACT

In order to protect the sidewall of a vehicle wheel from damage caused by an antiskid chain mounted on the wheel, a sidewall protection cover having a U-shaped body is provided. The sidewall protection cover accommodates a chain link of a chain side strand that is situated against the sidewall. The body is preferably one piece and has two wings that are connected along a spine, where the wings enclose a space for accommodating the chain link, and at least one of the wings has a holding element, on its side that faces inward, in the form of a projection for holding the chain link and/or a connection element suspended on it in place between the wings.

12 Claims, 3 Drawing Sheets

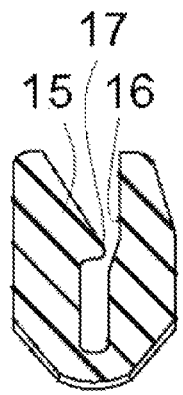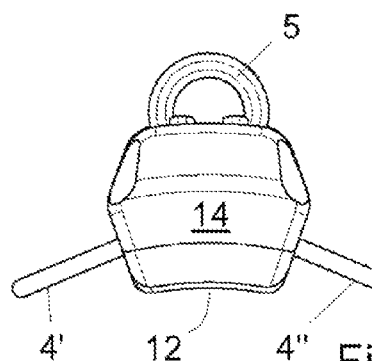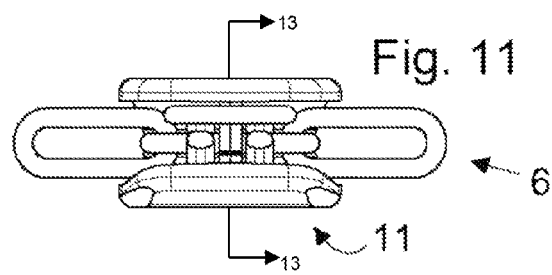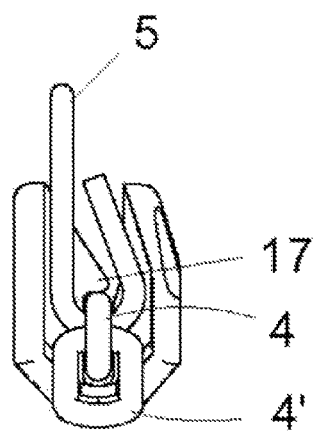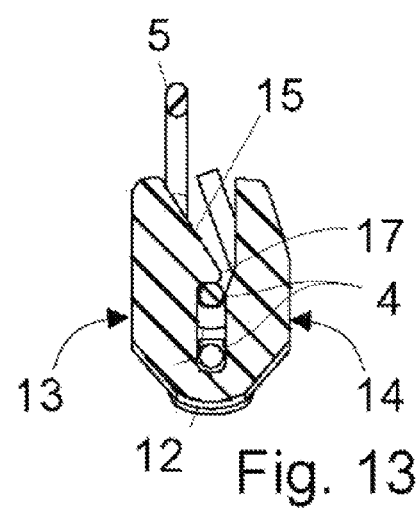

ANTISKID CHAIN WITH SIDEWALL PROTECTION COVERS

CROSS REFERENCE TO RELATED APPLICATIONS

This application claims priority from Austrian Patent Application Serial No. A 1534/2010, filed on Sep. 15, 2010.

BACKGROUND OF THE INVENTION

The present invention relates to a sidewall protection cover for an antiskid chain as well as to an antiskid chain equipped with such a sidewall protection cover. The antiskid chains described here are, in particular, antiskid chains having a chain mesh with track crosspieces and at least one side strand, which has chain links and lies against a sidewall of a vehicle wheel (particularly the tire sidewall and/or the rim on the outside of the wheel) when in an installed state. The track crosspieces are connected with the side strand by way of connection means (for example, in the form of a hook), suspended in at least one chain link of the side strand, in each instance, where a sidewall protection cover is provided per connection means.

A sidewall protection cover of the type described here is used in antiskid chains for vehicle tires and wheels, and serves to protect a sidewall of a vehicle tire and/or rim on which the antiskid chain according to this invention is affixed. Specifically in the case of antiskid chains, there is a risk of damage to the sidewall, particularly at the location of the connection of the track crosspieces to a side strand. The element that serves to make the connection between the track crosspieces and the side strand (for example, a metal hook), which is generally larger than the links of the track crosspieces, because of its function, can impair or even damage the surface of the wheel sidewall surface when it makes contact with the surface thereof. By the use of a sidewall protection cover, the connection element may essentially be packaged so that the wheel sidewall remains undamaged.

Within the scope of this disclosure, the term "track crosspieces" is understood to mean those chain parts or strand parts of the antiskid chain that run over the running surface of the tire and/or serve to connect such chains/strand parts with a side strand.

European Patent No. 2 163 409 discloses a device of this type, specifically a rim protection device that consists of a two-part shell that can be flipped open, in which a chain link and a hook are enclosed, where, in the state of being affixed on the chain, only that part of the hook that serves for connecting chain mesh parts projects out of the rim protection device. Drawbacks to this device include that it is complicated in terms of its structure and tends to collect dirt in its interior.

European Patent No. 1 520 734 discloses a bracing device for snow chains in which the track crosspiece is suspended in the side strand by way of hooks. A head part of this bracing device encloses the chain link of the side strand into which such a hook is suspended, but leaves the hook itself free, so that the latter can still come into contact with the sidewall or rim.

European Patent No. 0 976 588 discloses a sidewall protection device which encloses the hook entirely, together with the related end links of the track crosspiece chains. Drawbacks to this device include that during the operation of the antiskid chain, additional stresses occur at the track crosspiece and at the sidewall protection cover itself, and equalization movements of the track crosspiece lead to movements of the device relative to the sidewall of the tire.

It is therefore an object of the present invention to create a sidewall protection device that can be produced with little effort and installed in a simple manner, that covers the connection location and which overcomes the aforementioned disadvantages of the known devices.

SUMMARY OF THE INVENTION

In one embodiment, the present invention comprises a sidewall protection cover for accommodating a chain link of a chain strand situated over the side wall of a vehicle wheel, the sidewall protection cover comprising a U-shaped body, the U-shaped body having two wings that are connected along a spine, wherein the wings enclose a space for accommodating the chain link therein, and at least one of the wings has a projection for holding the chain link and/or a connection element suspended in it in place between the wings, on its side that faces inward.

In another embodiment, the present invention comprises an antiskid chain comprising a chain mesh having a plurality of track crosspieces, at least one side strand having chain links and which lies against a sidewall of a vehicle wheel in an installed state, and a plurality of sidewall protection covers, each of the sidewall protection covers comprising a U-shaped body, the U-shaped body having two wings that are connected along a spine, wherein each of the track crosspieces are connected with the at least one side strand by way of a connection means suspended in at least one chain link of the at least one side strand to form a plurality of connection locations, and each of the sidewall protection covers surrounds the connection means and the at least one chain link of the at least one side strand at each of the connection locations.

Further aspects of the present invention include the following:

A sidewall protection cover for accommodating a chain link of a chain strand situated on top of the sidewall of a vehicle wheel, using a U-shaped body that has two wings that are connected along a spine, where the wings surround a space for accommodating the chain link, and at least one of the wings has a holding element on its side that faces inward, in the form of a projection for holding the chain link and/or a connection element suspended in it in place between the wings.

The sidewall protection cover is used, as has been mentioned, in an antiskid chain of the type mentioned initially, in which a sidewall protection cover according to the invention is provided per connection means, surrounding the at least one chain link of the side strand, in each instance. In order to facilitate connecting the track crosspieces, a part of the connection means (for example hook) that serves to make the connection can project out of the sidewall protection cover.

By means of this special shaping, the stated objective is accomplished in surprisingly simple but nevertheless practical manner. The U shape of the sidewall protection cover according to the invention permits the component to be simply set on, over the chain link that is part of the connection location and the connection element itself, similar to a clip or sleeve. In the case of the underlying U shape, the two shanks of the U are formed by the two wings that come together by way of a spine, on one side (corresponding to the bottom rounded part of the U), while for the remainder, the wings are independent and essentially form flaps that lie parallel to one another and opposite one another—like the two halves of a clam shell. This results in uncomplicated production as well as easy installation by means of setting it on.

In a preferred implementation of the sidewall protection cover according to the invention, the U-shaped body, namely the two wings and the spine, is configured in one piece, in order to achieve additional simplification of the method of construction.

In order to achieve reliable fixation of the sidewall protection cover according to the invention, the holding element can be configured as a projection that projects inward, which surrounds the chain link (for example in interaction with the bottom of the space for accommodating the chain link) or engages into its eye, and thereby holds it in place in a relaxed state of the sidewall protection cover. Furthermore, the setting-on process can be facilitated in that because of the elasticity of the spine, the two wings can be bent apart from one another in such a way that at least introduction of the chain link is made possible.

In order to prevent the cover from sliding sideways relative to the connection location, on the antiskid chain, one wing can have a rail on its inside, which begins on the inside of the spine and runs away from it, where the holding element is disposed on the rail of the wing. In this connection, each of the two wings can have a rail of this type on its inside, where the holding element is disposed on the rail of the wing that is provided to lie on the sidewall.

Furthermore, it is advantageous if the wing that is provided to lie on the side of the wheel has an essentially flat outer contact surface. The wing that lies opposite this wing can furthermore have a shell-like curvature, which is designed in such a manner that a suspended connection means held in place between the wings can be held in place. The aforementioned shell-like curvature is curved outward (or to the front) here, so that a hollow dome is formed in the interior of the second wing.

BRIEF DESCRIPTION OF THE DRAWINGS

The present invention, including additional advantages thereof, will be explained in greater detail below with reference to a non-restrictive exemplary embodiment, shown in the appended drawings, in which:

FIG. 9 is a sectional view taken along line 9-9 of FIG. 5;

FIG. 10 is a front view of the sidewall protection cover of FIG. 5 installed on an outer side strand of the antiskid chain of FIG. 1;

FIG. 11 is a top view thereof;

FIG. 12 is a side view thereof; and

FIG. 13 is a sectional view taken along line 13-13 of FIG. 11.

DETAILED DESCRIPTION OF THE PREFERRED EMBODIMENTS

Figure 1:
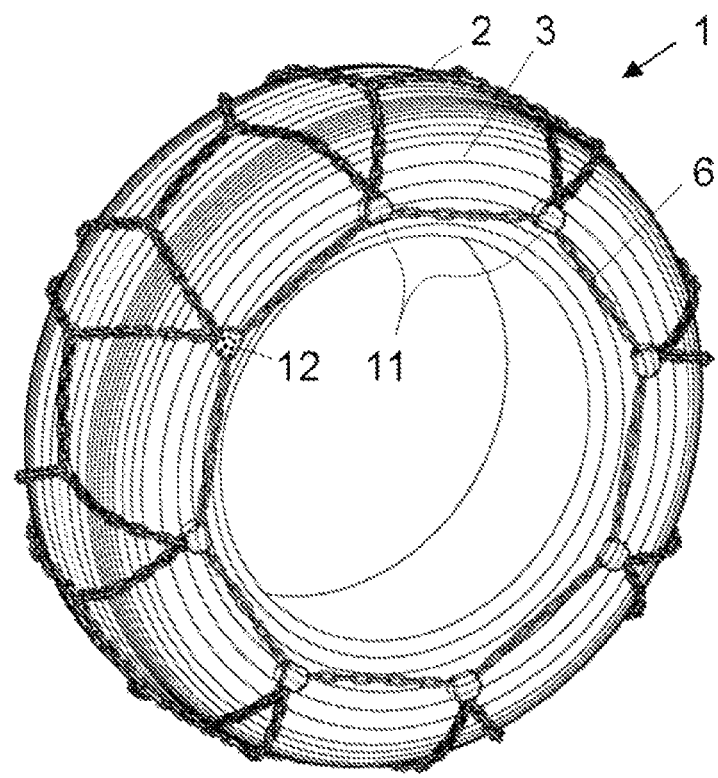
FIG. 1 is a perspective view of the outside of a tire with an antiskid chain having sidewall protection covers according to one embodiment of the present invention.
Figure 2:
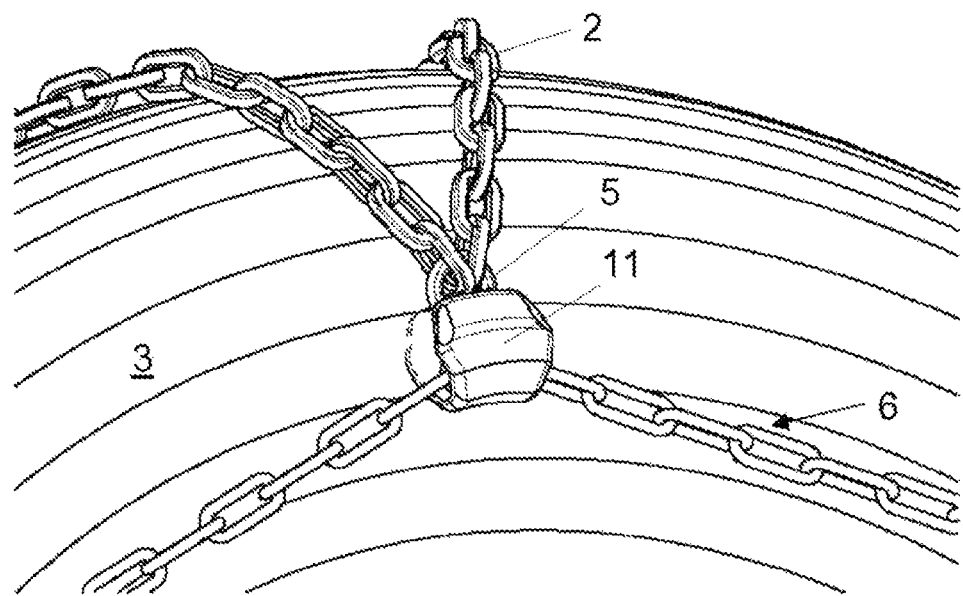
FIG. 2 is an enlarged portion of FIG. 1, depicting one of the sidewall protection covers in the installed position.

As shown in FIGS. 1 and 2, an antiskid chain 1 according to the present invention has a chain mesh with track crosspieces 2 and a side strand 6 that lies against a tire sidewall 3 when the chain 1 is installed on a wheel. In this connection, a side strand is understood to be an edge strand of the antiskid chain 1, which is preferably configured to form a closed ring-like shape, and which can be implemented as a single chain or in chain parts, but more frequently as a whole. In this embodiment, the side strand 6 is not used as a tension strand. In alternate embodiments, the side strand can be configured as a tension strand, by means of including spring elements or tension elements, for example.

Figure 3:
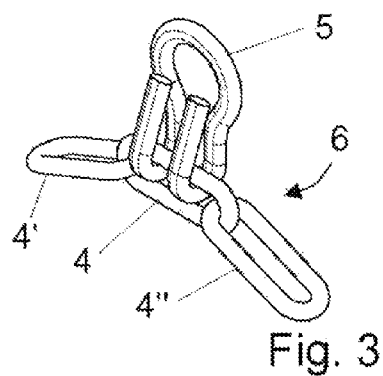
FIG. 3 is a perspective view of a portion of an outer side strand of the antiskid chain of FIG. 1, with the sidewall protection cover removed, showing a hook suspended in a chain link of the side strand for connecting the side strand to a track crosspiece.
Figure 4:
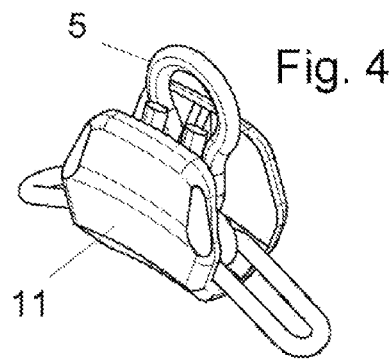
FIG. 4 is a perspective view of the portion of outer side strand of FIG. 3 with the sidewall protection cover installed thereon.
Figure 5:
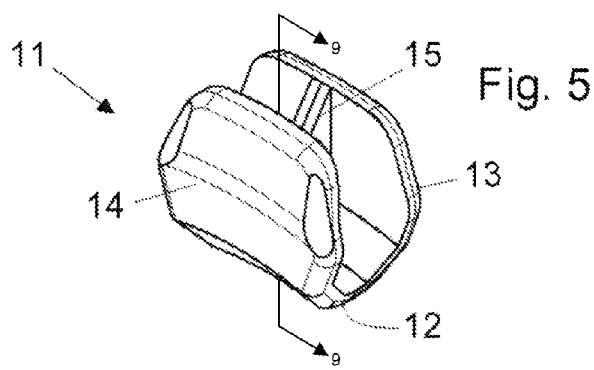
FIG. 5 is a perspective view of the sidewall protection cover of FIG. 4.
Figure 6:
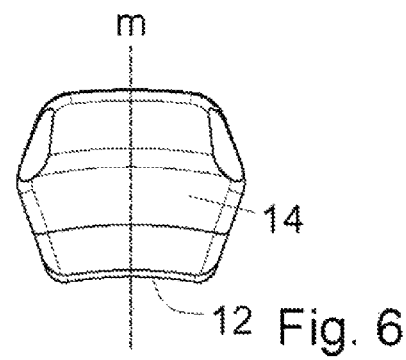
FIG. 6 is a front view thereof.
Figure 7:
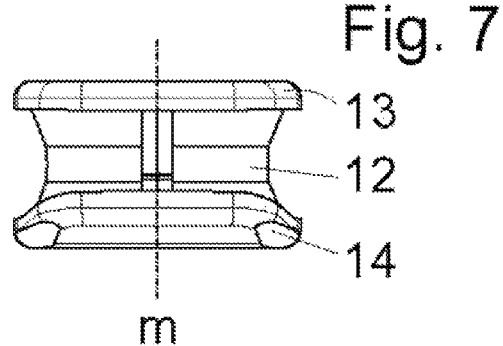
FIG. 7 is a top view thereof.

FIG. 3 shows a connection means by which, in this embodiment, the track crosspieces 2 may be connected with the side strand 6. In this embodiment, the connection means are implemented as hooks 5 which are suspended in at least one chain link 4 of the side strand 6. The location where a connection means/hook 5 is attached to a side strand 6 will hereinafter also be referred to as a connection location. FIG. 4 shows a sidewall protection cover 11, in the form of a clip, that encloses each hook 5 and the at least one chain link 4. Without this clip, the metal hook 5 can touch the surface of the wheel sidewall 3, and could thereby impair or damage the sidewall 3 and/or rim due to rubbing of the hook 5 on those surfaces in the case of imprecise installation. The clip 11 has a relatively smooth surface facing the wheel sidewall 3, thereby avoiding impairment of or damage to the wheel sidewall 3.

Furthermore, it is possible, in order to facilitate installation and removal, to mark at least one of the clips 11 in a particular manner, for example by means of special coloring. Thus, as shown in FIG. 1, one clip 12 may be particularly marked (e.g., one clip 12 is shown with dots in FIG. 1). Alternatively, one clip may be a different color from the other clips 11. A precise position of the chain on the wheel can thus be indicated by means of the marking of the clip 12.

FIG. 4 shows the connection location shown in FIG. 3 with a clip 11 installed thereon. The chain link 4 is situated completely within the interior of the cover 11, while the part of the hook 5 that serves for connecting the track crosspieces 2 projects out of.

FIGS. 5 to 9 show the clip 11 in various views. Specifically, in FIG. 5 in a perspective view, in FIG. 6 in a front view, in FIG. 7 in a top view, in FIG. 8 in a side view (from the left), and in FIG. 9 in a sectional view taken along the center plane m (see FIGS. 6 and 7) of the clip 11 (i.e., along the line 9-9 shown in FIG. 5). The designations "top"/"bottom," "front"/ "back," "right"/"left" or the like, as used in this specification, refer to a particular orientation in which a spine 12 of the clip 11 rests on a horizontal surface, while the two wings 13, 14 extend upwardly and a first wing 14 is oriented towards the front and a second wing 13 is oriented towards the back. These directional terms do not refer to a possible orientation of the clip 11 in space or on a chain (which can be installed on a wheel that might be rotating), at any particular time. With this designation convention, it should be understood that the back side of the clip 11 is formed by the wing 13 which lies against the sidewall of the wheel in the installed stated, while the front wing 14 runs at a distance from the sidewall, and in this manner, the front wing 14 of the clip 11 is seen when looking at the side of a wheel.

The body of the clip 11 is essentially formed by the two wings 13, 14, which are connected only along their bottom edge by spine 12. The wings 13, 14 are otherwise are not in contact with one another. This gives the clip 11 essentially a U-shape. The spine 12 that forms the connection between the two wings 13, 14 is preferably situated, as in this embodiment, at the side of the clip that is oriented toward the wheel hub in the installed state (see FIGS. 1, 2, and 10). The clip 11 has a plane of symmetry m (see FIGS. 6 and 7) that runs through the center of the spine 12, and the wings 13, 14. The two wings 13 and 14 can furthermore be mirror images of one another, but in the embodiment shown, they are structured to be slightly different, as will be explained further below.

The wings 13, 14 enclose a space that is designed to accommodate a chain link 4 of the side strand, as well as to accommodate at least part of the hook 5 suspended in the side strand 6 (or, more generally, the element for connecting to the track crosspieces 2). This part would otherwise lie directly on the sidewall 3 of the wheel if no sidewall protection device were affixed. A rail (or ridge) 15, 16, in each instance, runs on the inside of the wings 13, 14, namely along the center line m. One of the rails, preferably the back rail 15, which in this embodiment is present on the inside of the back wing 13, has a projection 17. The projection 17 of the exemplary embodiment shown is one integral piece with the rail 15 or the wing 13, respectively, in harmony with its property as a projection.

FIGS. 10 to 13 show the clip 11 together with a piece of the side strand (see FIG. 4), more precisely in a state set onto a connection location (i.e., chain link 4 with a hook 5). Chain links 4', 4'' of the side strand 6 that follow the chain link 4 project outwardly from the clip 11. With regards to the views shown, FIGS. 10 to 13 correspond respectively to FIGS. 6 to 9, in each instance. FIGS. 10 to 13 illustrate how the clip is held on the chain link 4 and the hook 5. As is particularly evident from FIGS. 12 and 13, the rails 15, 16 hold the chain link 4 in an upright position in the clip 11 and furthermore prevent the hook 5 from slipping sideways, in that the rails 15, 16 engage between the two shanks of the hook 5. Movement of the chain link 4 in an upward direction is prevented by the projection 17, which thus serves as a projection holding means according to the present invention.

Figure 8:
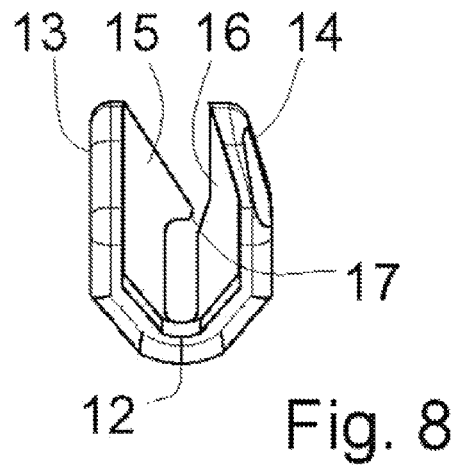
FIG. 8 is a side view thereof.

With reference to FIGS. 8 and 12, the back wing 13 has a flat, preferably level outer surface, having no projections or burs, which when installed lies contact with the wheel sidewall 3 without damaging it. The front wing 14, on the other hand, is curved slightly outward (i.e., towards the front), in order to achieve a better hold of the elements of the side strand that are held in the interior of the clip.

The body of the clip 11 is preferably configured in one piece and consists of a shape-stable plastic that permits a certain elastic deformability, at least in the case of the spine 12, such as polyamide, for example. Other plastics that are not too brittle can also be used, such as, for example, polypropylene, polyethylene, or the like.

When a clip 11 is mounted on a connection location, the clip is pushed onto a hook 5 in such a manner that the back ridge engages between the two shanks of the hook 5. Because of the elasticity of the material of the body of the clip 11, the clip 11 may open enough so that the chain link 4 can be guided past the projection 17 so that the projection 17 snaps into its end position. In this connection, the slanted top edge of the ridge 15 facilitates introduction of the chain link 4. To release the clip 11 from the chain link 4, the clip 11 can be elastically bent open slightly, so that the projection 17 releases the chain link 4. However, removal of the clip 11 is generally not necessary.

As will be directly evident to a person skilled in the art, the scope of the present invention is not restricted to the exemplary embodiment shown and described above; instead, it extends to cover all embodiments that a person skilled in the art can comprehend and implement within the scope of protection of the claims.

The invention claimed is:

1. A sidewall protection cover for accommodating a chain link of a chain strand that is situated over the side wall of a vehicle wheel, the sidewall protection cover comprising a U-shaped body, the U-shaped body having two wings that are connected to each other only along a spine that is located at one end of the U-shaped body, wherein the wings enclose a space for accommodating the chain link therein, and at least one of the wings has a projection for holding the chain link and/or a connection element that is suspended in the chain link in place between the wings, the projection being located on a side of the at least one of the wings that faces inward towards the space.

2. The sidewall protection cover according to claim 1, wherein the U-shaped body is configured in one piece.

3. The sidewall protection cover according to claim 1, wherein when the sidewall protection cover is in a relaxed state and installed on the chain link and/or connection element, the projection surrounds the chain link and/or connection element and holds the chain link and/or connection element in place.

4. The sidewall protection cover according to claim 1, wherein the at least one of the wings has a rail on the side of the at least one wing that faces inward towards the space, the rail beginning at the end of the U-shaped body that includes the spine and running towards an end of the U-shaped body located opposite the spine, wherein the projection is disposed on the rail.

5. The sidewall protection cover according to claim 4, wherein each of the two wings has a rail on a side of the respective wing that faces inward towards the space, wherein each of the rails begins at the end of the U-shaped body that includes the spine and runs towards an end of the U-shaped body located opposite the spine, where the projection is disposed on the rail of the wing that is provided to lie on the side wall.

6. The sidewall protection cover according to claim 1, wherein one of the two wings is a first wing, the first wing is adapted to lie on the side of the vehicle wheel and has an essentially level outer contact surface.

7. The sidewall protection cover according to claim 6, wherein the wing that lies opposite the first wing is a second wing, and the second wing has a shell-like curvature that is suitable for holding the chain link and/or connection element in place between the two wings.

8. An antiskid chain comprising:
a chain mesh having a plurality of track crosspieces;
at least one side strand having chain links and which lies against a sidewall of a vehicle wheel in an installed state; and
a plurality of sidewall protection covers, each of the sidewall protection covers comprising a U-shaped body, the U-shaped body having two wings that are connected to each other only along a spine that is located at one end of the U-shaped body;
wherein each of the track crosspieces are connected with the at least one side strand by way of a connection means suspended in at least one chain link of the at least one side strand to form a plurality of connection locations, and each of the sidewall protection covers surrounds the connection means and the at least one chain link of the at least one side strand at each of the connection locations.

9. The antiskid chain according to claim 8, in which a part of the connection means that serves for connecting each of the track crosspieces to the at least one side strand projects out of the sidewall protection cover.

10. The antiskid chain according to claim 8, in which the connection means is a hook.

11. The antiskid chain according to claim 9, in which the connection means is a hook.

12. The antiskid chain according to claim 3, wherein the two wings can be bent apart elastically from one another to an extent that allows at least the introduction of the chain link therebetween.

* * * * *

UNITED STATES PATENT AND TRADEMARK OFFICE
CERTIFICATE OF CORRECTION

PATENT NO. : 8,522,846 B2
APPLICATION NO. : 13/233460
DATED : September 3, 2013
INVENTOR(S) : Agyd Pengg and Bernhard Niess It is certified that error appears in the above-identified patent and that said Letters Patent is hereby corrected as shown below:

Title Page, Item [73], the country of residency of the Assignee is listed incorrectly as "(AU)" and should read --(AT)--.

Signed and Sealed this
Nineteenth Day of November, 2013

Teresa Stanek Rea
*Deputy Director of the United States Patent and Trademark Office*